United States Patent [19]

Masunaga

[11] Patent Number: 4,522,492
[45] Date of Patent: Jun. 11, 1985

[54] DISTANCE MEASURING DEVICE
[75] Inventor: Makoto Masunaga, Tokyo, Japan
[73] Assignee: Canon Kabushiki Kaisha, Tokyo, Japan
[21] Appl. No.: 393,320
[22] Filed: Jun. 29, 1982
[30] Foreign Application Priority Data Jul. 10, 1981 [JP] Japan .................. 56-108718

[51] Int. Cl.³ .................................. G01C 3/10
[52] U.S. Cl. .................. 356/1; 250/201; 354/402; 354/403
[58] Field of Search .......... 356/1; 354/402, 403; 250/201, 204

[56] References Cited
U.S. PATENT DOCUMENTS

| | | | |
|---|---|---|---|
| 4,004,852 | 1/1977 | Pentecost | 356/1 |
| 4,274,735 | 6/1981 | Tamura et al. | 356/1 |
| 4,368,383 | 1/1983 | Shirasu et al. | 354/402 |
| 4,370,724 | 1/1983 | Herbst et al. | 354/402 |

Primary Examiner—S. C. Buczinski
Attorney, Agent, or Firm—Toren, McGeady, Stanger, Goldberg & Kiel

[57] ABSTRACT

A distance measuring device comprised of a system which projects infrared rays on a distant object, a light receiving optical system positioned at a prescribed base length from the infrared ray projecting system; a sensor of the signal storage type including an array of light sensitive elements arranged in a position which approximately coincides with the imaging plane of the light receiving optical system. A control means arranged to cause the sensor to perform a storing action under a first condition in which the infrared ray projecting system is allowed to operate and also under a second condition in which the infrared ray projection system is not allowed to operate, and digital computing means designed to detect a difference between output signals of every light sensitive element respectively produced under the first and second conditions and to detect a distance to the distant object on the basis of the results of detection of the difference between these signals.

5 Claims, 7 Drawing Figures

| 0 | F(D1) | (10) |
| --- | --- | --- |
| 1 | F(D2) | (14) |
| 2 | F(D3) | (20) |
| 3 | F(D4) | (14) |
| 4 | F(D5) | (10) |
| 5 | F(D6) | (6) |
| 6 | F(D7) | (10) |
| 7 | F(D8) | (6) |
| 8 | R(D1) | (10) |
| 9 | R(D2) | (14) |
| 10 | R(D3) | (20) |
| 11 | R(D4) | (18) |
| 12 | R(D5) | (30) |
| 13 | R(D6) | (8) |
| 14 | R(D7) | (10) |
| 15 | R(D8) | (6) |

FIG.7

| 0 | R(D1) − F(D1) | (0) |
| --- | --- | --- |
| 1 | R(D2) − F(D2) | (0) |
| 2 | R(D3) − F(D3) | (0) |
| 3 | R(D4) − F(D4) | (4) |
| 4 | R(D5) − F(D5) | (20) |
| 5 | R(D6) − F(D6) | (2) |
| 6 | R(D7) − F(D7) | (0) |
| 7 | R(D8) − F(D8) | (0) |
| 8 | R(D1) | (10) |
| 9 | R(D2) | (14) |
| 10 | R(D3) | (20) |
| 11 | R(D4) | (18) |
| 12 | R(D5) | (30) |
| 13 | R(D6) | (8) |
| 14 | R(D7) | (10) |
| 15 | R(D8) | (6) |

DISTANCE MEASURING DEVICE

BACKGROUND OF THE INVENTION

1. Field of the Invention

This invention relates generally to a distance device and more particularly to a distance measuring device designed to detect the distance to an object by the combined use of a radiant ray (or infrared ray) projecting element and a signal storage type radiant ray (infrared ray) sensor. The result is a detection suitably usable, for example, for automatic focusing control over the phototaking lens of a camera or the like.

2. Description of the Prior Art

Heretofore, various methods have been proposed and put into practice for distance measurement. Of these methods, methods of the passive type in which the distance is measured by detecting a change of a double image into a single image or the contrast of an image based on a light emitted by a distance measuring object the distance of which is to be measured have presented a problem in that the distance measuring performance of such a device decreases when the brightness of the object is low.

Meanwhile, active methods in which radiant rays, such as a light, are projected on the distance measuring object and the distance to the object is measured on the basis of light reflected by the object give a high degree of distance measuring performance. However, the active methods necessitate the use of a mechanical sweep system and also require some arrangement for keeping an electrical signal processing system at a high S/N ratio. A typical example of such methods is a device of the type in which the object is swept with a projection light to create a reflected light which is then received from the object by a light sensitive element and the distance is obtained from the sweep angle of the projection light at which the quantity of reflection light received by the light sensitive element becomes a maximum value, that is, where the maximum output of the light sensitive element is obtained. In this type of arrangement, it is absolutely necessary to carry out a sweep with the projection light. This tends to result in a complex mechanical structure. Further, in order to detect the maximum value of the output of the light sensitive element, use of a peak detection circuit or the like is, in general, necessary. The use, however, of a peak detection circuit is inevitably accompanied a time lag. The time lag makes correlation between the sweep angle $\theta$ of the projection light and a peak detection point of time hard to obtain. This degrades the accuracy of distance detection.

In another example of the conventional methods, the arrangement which sweeps with the projection light is replaced with an arrangement in which the projection angle of the projection light is fixed, a plurality of light sensitive elements are arrayed behind a light receiving optical system, and the distance is measured by determining which light sensitive element receives the reflection light to the greatest degree. Such a method, however, necessitates provision of a light receiving amplifier and a demodulator for every light sensitive element employed and thus tends to result in a complex structure which is difficult to adjust. Such a method, therefore, presents a problem in terms of economy.

SUMMARY OF THE INVENTION

It is therefore an object of this invention to provide an active type distance measuring device which eliminates the stated drawbacks of the prior art by using a signal storage type radiant ray sensor in a reflected radiant ray sensor system which digitally processes signals without any moving parts. More specifically, in the distance measuring device according to the present invention, radiant rays are projected on a distance measuring object by a radiant ray projection means, reflected radiant rays are then received by a signal storage type radiant ray sensor which is provided with an array of radiant ray sensor elements disposed behind the radiant ray receiving means which is disposed at a prescribed base length away from the projection means. The position of a sensor element that has the greatest difference between the amount of radiant rays received when radiant rays are projected from the projection means and the amount of radiant rays received when no radiant rays are projected is arranged to correspond to the distance of the distance measuring object.

Further, as for a signal processing operation to be performed in accordance with the invention, the outputs of each of the above stated sensor elements produced at the time of radiant ray projection and at the time of non-projection are converted into digital data separately from the outputs of other elements. After that, the digital data of the different radiant ray sensor elements thus obtained is stored at different locations in a memory device. Following that, the difference between the amount of radiant rays received at the time of radiant ray projection and the amount of radiant rays received at the time of non-projection is computed for each of the radiant ray sensor elements. The digital data relative to the computed difference thus obtained is again stored in the memory device. Then, the element which has the greatest difference is identified on the basis of the stored data relating to the difference. The position of the identified element within the array is obtained as a datum relative to a distance. Use of a micro-computer permits carrying out such computing process not only at a very high speed but also with a high degree of precision. The arrangement according to the invention thus completely obviates the drawbacks of the conventional devices and permits distance measurement with a high degree of precision, The above and further objects, features and advantages of the invention will become apparent from the following detailed description of a preferred embodiment thereof taken in connection with the accompanying drawings.

BRIEF DESCRIPTION OF THE DRAWINGS

In the accompanying drawings.

DETAILED DESCRIPTION OF THE PREFERRED EMBODIMENT

Figure 1:
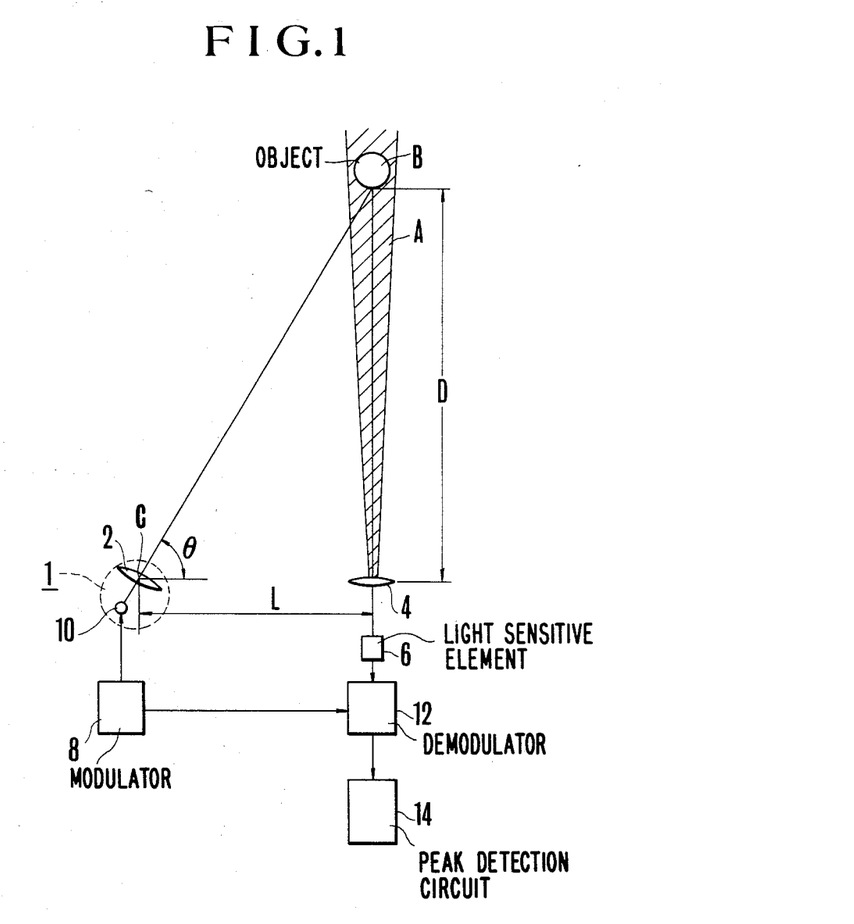
FIG. 1 is a block diagram showing an example of the conventional distance measuring devices of the active type.

An example of the conventional active type distance measuring device is as shown in FIG. 1. In FIG. 1, reference numeral 1 indicates an infrared ray (or light) projection system which includes a projecting optical system 2 arranged to project infrared rays, emitted from an infrared ray (or light) emitting element 10, in the form of a limited beam. The infrared ray (or light) projection system 1 is arranged to be capable of turning or sweeping the infrared beam from the close-up side to the infinity side of a distance measurement visual field A on an axis C which for example coincides with the center of the optical system 2. The distance measuring device further comprises a light receiving optical system 4 which is arranged to receive reflected infrared light coming from the distance measuring visual field A, a light sensitive element 6 which receives the infrared light from the light receiving optical system 4 and converts the infrared light thus received into an electrical signal, a modulator 8 which modulates the infrared light emitted from the infrared ray emitting element 10 by applying a modulation signal to the element 10, a demodulator 12 which takes out a component of the infrared light emitted from the infrared ray emitting element 10 according to the modulation signal, and a peak detection circuit 14 which is arranged to detect the peak of an electrical signal from the demodulator 12 when the peak is produced and to produce a peak detection signal.

In the structural arrangement of the conventional device, the light projecting optical system 2 and the light receiving optical system 4 are spaced at a prescribed base length L to form a trigonometrical measurement system in relation to a distance measuring object B located within the distance measurement visual field A. In other words, when the light projection system 1 is in an angular position so that the projected infrared light strikes the distance measuring object B, the infrared light is reflected from the object B and comes into the light receiving optical system 4. At this point of time, the sweep angle $\theta$ of the light projection system 1 and the distance D to the object B are in a relation of $D = L \tan \theta$. Accordingly, the infrared, light projected from the light projection system 1 falls upon the distance measuring object B and is reflected to return to the light receiving optical system 4 when the light projection system 1 is at an angle $\theta$. In carrying out distance measurement, the angle $\theta$ of the light projection system 1 is gradually increased, that is, the light projection system 1 is turned to sweep the distance measuring visual field A with the projected infrared light from a close-up point to an infinity point. Meanwhile, the intensity of the reflected infrared light incident upon the light sensitive element 6 coming through the light receiving optical system 4 is detected. Then, the angle $\theta$ of the light projection system 1 at which the intensity of the reflected infrared light incident upon the element 6 becomes strongest is determined.

However, the infrared light that is to be detected at the light sensitive element 6 is not always limited to the infrared light emitted from the infrared ray emitting element 10 and reflected by the object B. It includes an infrared component of the natural light. This degrades the S/N ratio of the infrared light detector. Because the intensity of the reflected infrared light is lower than that of the direct light, the detection often becomes difficult. In view of this, the infrared light emitted from the infrared ray emitting element 10 is modulated by the modulator 8 and, the detection signal representing the infrared light detected by the light sensitive element 6 is guided to the demodulator 12 to extract infrared light component emitted from the infrared ray emitting element 10. Even the reflected infrared light of low intensity is thus detected. The signal produced by the demodulator 12 is guided to the peak detection circuit 14. The peak detection circuit 14 then detects the peak of the signal. With the peak detected, the angle $\theta$ of the projection system 1 at which the largest amount of reflection infrared light comes from the distance measuring object B is determined.

This arrangement, however, inevitably necessitates a mechanical turning of the light projection system 1. This not only results in a complex structure but inevitably causes some time lag in the peak detection performed by the peak detection circuit 14. Therefore, it becomes difficult to correlate the angle $\theta$ of the light projection system 1 with the point of time of peak detection.

In a conceivable solution to this problem, the projection angle of the light projection system 1 is arranged to be fixed instead of turning the light projection system 1 while a plurality of light sensitive elements are arranged behind the light receiving optical system and the element that receives the reflected light in the largest amount is detected. This alternative, however, necessitates provision of a light receiving amplifier and a demodulator for every light sensing element. Accordingly, this results in a complex structural arrangement and makes adjustment work difficult. This is uneconomical.

These problems of the conventional devices are solved by a preferred embodiment of the present invention shown in FIGS. 2 through 7. First referring to FIG. 2 which shows an example where a storage type line sensor having eight light sensitive elements is used and a distance to the distance measuring object is divided into eight zones. This embodiment includes an infrared ray emitting diode 16 (IRED) which forms a point source of infrared rays, a light projection lens 18 which directs the infrared light emitted from the IRED 16 in the form of a parallel pencil of rays toward the distance measuring object 20, a light receiving lens 22 which is placed at a distance of a prescribed base length l from the light projection lens 18, an infrared transmitting filter 24 which cuts the visible band of light in accordance with the wave length of the projected infrared light of the IRED 16, a storage type line sensor 26 of eight bit arrangement which is placed behind the light receiving lens 22 and is arranged to receive the infrared light coming through the filter 24 and the light receiving lens 22 as distribution of infrared rays to eight parts, an A/D converter 30 arranged to convert the eight signals produced by the line sensor 26 representing the intensity distribution of infrared rays to the eight light sensitive elements of the sensor 26 into 8 bit digital signals one after another, a random access memory (RAM) 32 which is designed to store the 8 bit data and is capable of storing up to 16 data, a shift register 34 for 8 bit operation, an operation circuit 36 arranged to carry out a subtraction process on data received, a carry flip-flop 38 which is arranged to store a carry resulting from the operation performed at the above stated operation circuit 36, and a sequence controller 40 which gives control signals to the line sensor 26, the A/D converter 30, the RAM 32, the shift register 34 and the operation circuit 36.

Figure 3:
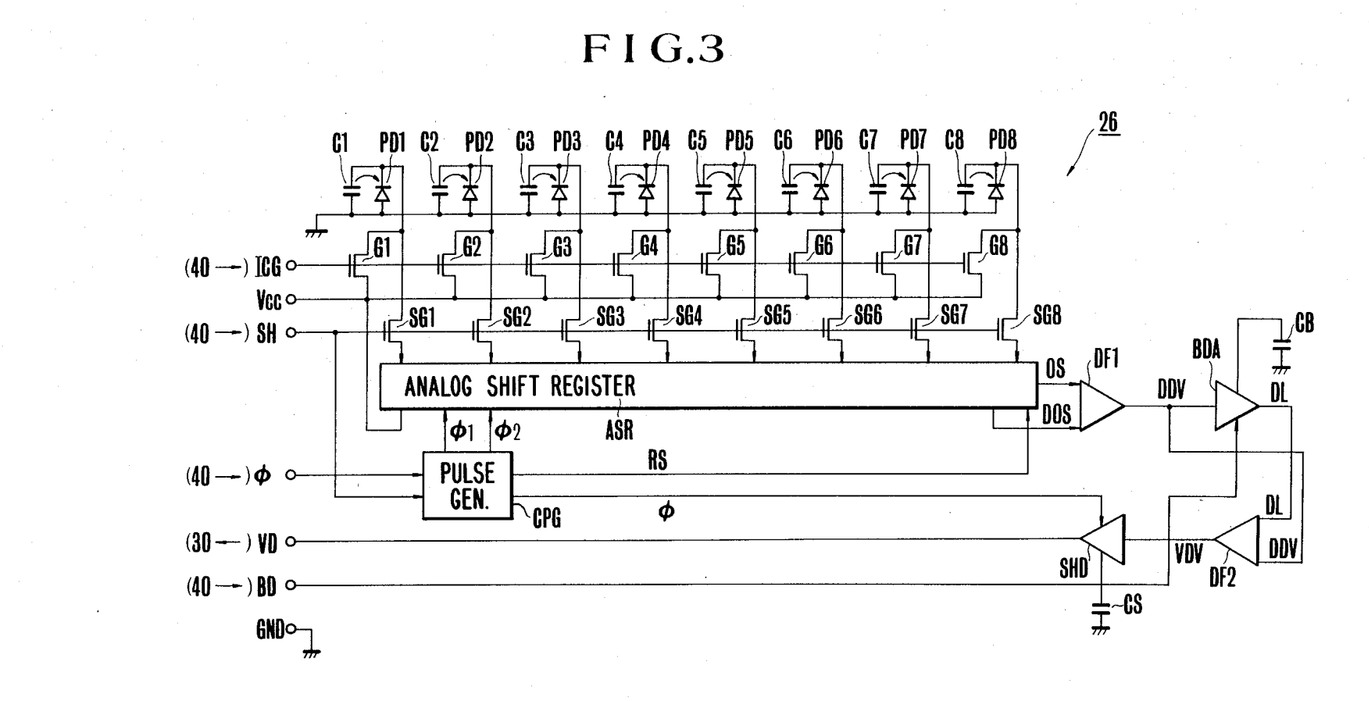
FIG. 3 is a circuit diagram showing the arrangement of the radiant ray sensor which is shown in FIG. 2.
Figure 4:
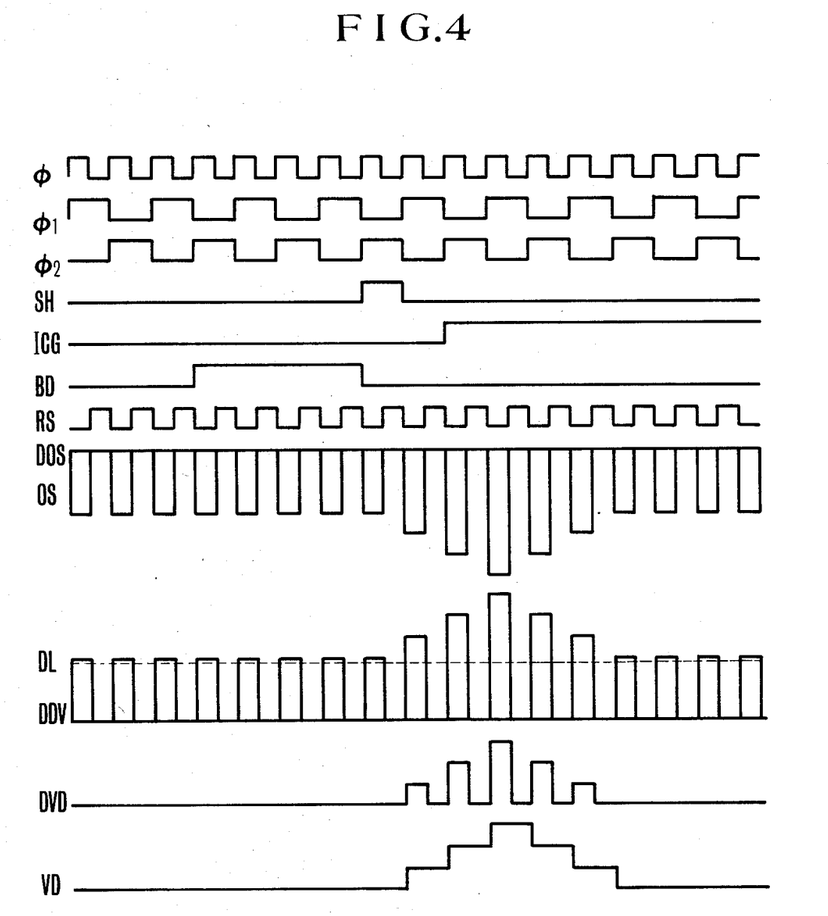
FIG. 4 is a time chart showing the operation of the radiant ray sensor shown in FIG. 3.

The details of each circuit parts of the embodiment will be understood from the following description. The arrangement of the line sensor 26 is as shown in FIG. 3. Referring to FIG. 3, eight photo diodes PD1–PD8 are arranged as light sensitive elements. Capacitors C1–C8 for signal storing are arranged in parallel and correspond to light sensitive elements PD1–PD8. Clear gates G1–G8 are arranged for each of the capacitors C1–C8 to precharge them to a VCC level. An analog shift register ASR is arranged to transfer in series the electric charges of the capacitors C1–C8 which are taken therein in parallel through shift gates SG1–SG8. A pulse generator CPG which is arranged to provide transfer pulses $\phi_1$ and $\phi_2$ to the above stated analog shift register ASR. A differential amplifier DF1 is arranged to detect a difference between the reference level of the analog shift register and the level of the output signal thereof. The signal level of the analog shift register at the time of blank transfer is stored at a blank transfer level memory circuit BDA. This blank transfer signal level corresponds to the level of a dark current. The blank transfer level memory circuit BDA is provided with a storing capacitor CB. The circuit further includes a differential amplifier DF2 which subtracts the output of the blank transfer level memory circuit BDA from the output of the above stated differential amplifier DF1 and extracts only the light receiving signal component of the light sensitive elements PD1–PD8, a sample hold circuit SHD which converts the signal from the differential amplifier DF2 into a signal of a predetermined level in bit unit, and a capacitor CS which is provided for the purpose of holding the signal of the above stated sample hold circuit SHD. The line sensor which is arranged in this manner operates as described below references are to the time chart of FIG. 4:

The signals to be applied to the line sensor 26 from the sequence controller 40 include clock pulses $\phi$ serving as the base for the transfer clock pulses $\phi_1$ and $\phi_2$ of the analog shift register ASR, a clear gate signal ICG which commands the clear gates G1–G8 to clear the storing signal of the capacitors C1–C8, a blank transfer memory signal BD which commands the memory circuit BDA to store the blank transfer level of the analog shift register ASR, and a shift pulse SH which commands the shift gates SG1–SG8 to shift the stored electric charges of the capacitors C1–C8 to the analog shift register ASR.

When the clear gate signal ICG is at a high level and the shift pulse SH is at a low level, all the clear gates G1–G8 are on and all the shift gates SG1–SG8 are off. Accordingly, the analog shift register ASR is in a blank transfer mode. Meanwhile, since the clear gates G1–G8 are on, the photo currents of the light sensitive elements PD1–PD8 are in such a state that a current from the power source level VCC is supplied to the capacitors C1–C8 and, accordingly, the levels of the stored signals of the capacitors C1–C8 are approximately at the VCC level.

Under this condition, when the level of the clear gate signal ICG drops to a low level, each of the clear gates G1–G8 turns off. Therefore, the photo currents of the light sensitive elements PD1–PD8 come to be supplied from the capacitors C1–C8. Therefore, the voltages of the capacitors C1–C8, after the lapse of a given length of time, vary according to the levels of light incident on the light sensitive elements PD1–PD8.

After that, when the level of the shift pulse SH is changed to a high level, each of the shift gates SG1–SG8 is turned on and the electric charges of the capacitors C1–C8 are shifted to the analog shift register ASR.

The clock pulses $\phi_1$ and $\phi_2$ from the pulse generator CPG cause the analog shift register ASR to transfer, in series, the analog data taken therein and to produce them from the right end thereof as a signal OS. Since the analog shift register is performing an electric charge transfer, the electric charge that appears at the output terminal thereof must be cleared. Therefore, the pulse generator CPG is arranged to supply reset pulses (RS=$\overline{\phi}$ in this particular embodiment) to the analog shift register ASR. Further, the analog shift register ASR also produces a signal DOS, which is a compensating output, to give a reference for the signal OS.

It will be apparent also from the description given above, that when the level of the clear gate signal ICG drops to a low level, signals corresponding to the photo currents of the light sensitive elements PD1–PD8 are stored at the capacitors C1–C8. Therefore, following that, the time before the electric charges of the capacitors C1–C8 are transferred to the analog shift register ASR by producing the shift pulse SH is controlled as desired, so that stable levels of signals can be obtained as desired for every brightness level.

The signal OS which corresponds to the amount of light and the reference level signal DOS are thus produced from the analog shift register ASR and are applied to the first differential amplifier DF1. Then, the amplifier DF1 produces a signal DDV which includes the blank transfer level.

A specific description of operation for extracting, from the line sensor 26, the signals corresponding to the distribution of light is as follows. When the basic clock pulses $\phi$ are supplied to the sequence controller 40, the pulse generator CPG produces the transfer pulses $\phi_1$ and $\phi_2$ and the reset pulses RS for the analog shift register ASR. The phase adjustment for the transfer pulses $\phi_1$ and $\phi_2$ is effected within the pulse generator CPG by supplying the shift pulse SH immediately after the power source is turned on.

When the clear gate signal ICG which is supplied by the sequence controller 40 drops to a low level, storing of signals corresponding to the photo currents of the light sensitive elements PD1–PD8 at the capacitors C1–C8 begins. Before the shift pulse SH is produced, however, the blank transfer memory signal BD is produced. Then, out of the output signal DDV of the differential amplifier DF1, the level of the blank transfer period is memorized at the blank level memory circuit BDA. The circuit BDA produces it as a blank transfer level DL. The blank transfer level DL is supplied to the second differential amplifier DF2 as a reference level. Therefore, at the second differential amplifier DF2, the blank transfer level DL is subtracted from the signal DDV coming from the first differential amplifier DF1. The result of this subtraction is produced as a signal VDV.

Next, when the shift pulse SH is produced, the electric charges which have been stored at the capacitors C1–C8, according to the photo currents of the light sensitive elements PD1–PD8, are transferred to the analog shift register ASR. As a results of this, the signal OS is produced from the register ASR. As mentioned, this signal is subtracted from the reference level DOS at the first differential amplifier DF1. The signal further has the blank transfer level DL subtracted therefrom at the second differential amplifier DF2. Through these subtraction processes, the signal OS eventually becomes a seriated signal VDV corresponding to the amount of light distributed to the light sensitive elements PD1-PD8. The signal VDV thus obtained remains in a fallen state, or at a reset level, as long as the reset pulses RS are being supplied to the analog shift register ASR. Accordingly, the sample hold circuit SHD which is responsive to the clock pulses $\phi$ converts this signal into a continuous scanning signal DV which has no falls. Further, after the shift pulse SH is produced, the clear gate signal ICG is brought back to a high level to ready it for next read-out.

As described in the foregoing, the line sensor 26 can be arranged to have the dynamic range of the varying amounts of the detected light by controlling the storage time to permit a plurality of signals to be taken out in the form of a seriated signal. This obviates the necessity of providing an amplifier circuit for the photo current of every light sensitive element. The arrangement, therefore, is highly advantageous where a plurality of light signals must be processed.

The operation of the distance measuring device of this embodiment will be more fully understood from the following description.

Figure 2:
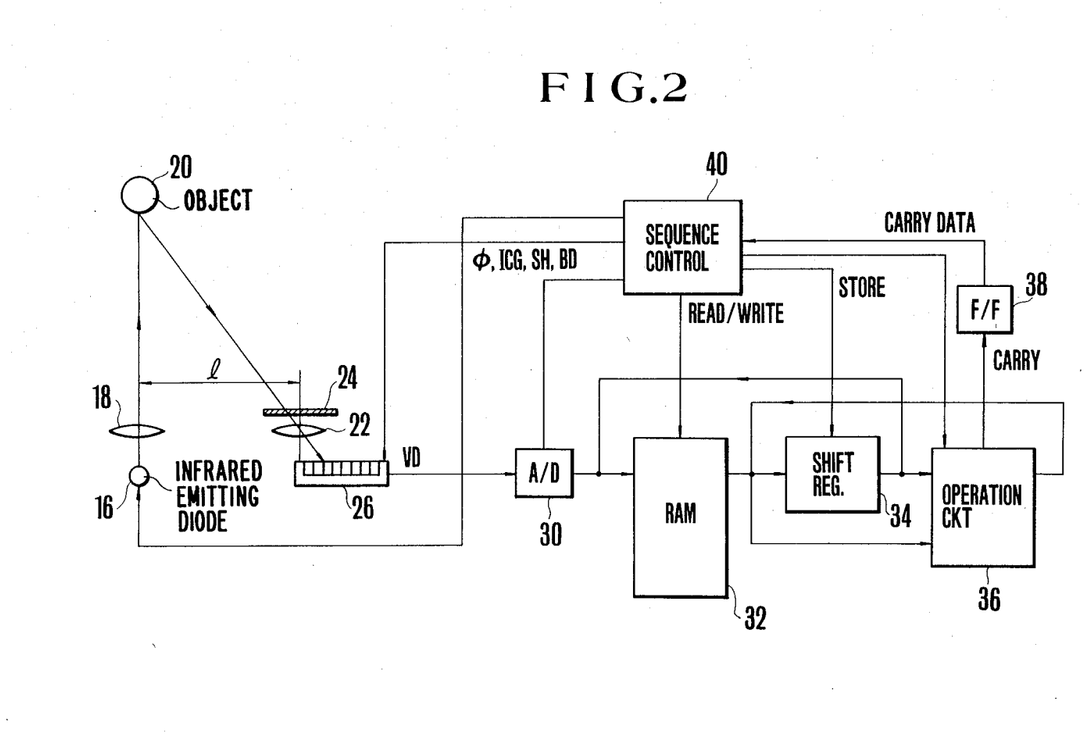
FIG. 2 is a block diagram showing a distance measuring device as an embodiment of the present invention.

In order to effectively read out from the line sensor 26, it is a first prerequisite to optimize the storage time. To determine the storage time, it is preferable to first give a predetermined storage time, to examine the level of the scanning signal DV obtained as a result of it, and then, in accordance with the result of examination, to adjust the storage time in a stepwise manner.

For that purpose, the longest storage time T1 is given to the line sensor 26 without effecting any power supply to the IRED 16. In this instance, the line sensor 26 may have some infrared rays resulting from external light conditions, applied thereto through the filter 24. In cases where the level of this does not exceed a predetermined level, however, the sequence controller 40 gives a storage time one step shorter than the longest time to the line sensor 26. Then, the storage time is examined for appropriateness thereof. If it is found to be inappropriate, a storage time shorter by another step is given to the line sensor. A final storage time can be thus obtained by repeating such examination steps. In setting the storage time, the scanning signal DV, which is read out from the line sensor 26, is converted by the A/D converter 30 into a digital signal of 8 bits for every light sensitive element PD1-PD8. The digital signal for each of the light sensitive elements of the line sensor is stored at a corresponding address prescribed in the RAM 32. Then, all the values thus obtained are compared with a predetermined constant to judge whether the values are not exceeding the constant. The judgement of the result of comparison performed at the operation circuit 36 is made at the sequence controller 40 by judging the condition of the carry flip-flop 38.

With the storage time determined through the process described above, the scanning signal DV which results from the effect of external light conditions on the line sensor 26 during this storage time is received. This is performed by converting every component of the scanning signal DV corresponding to the bits (or elements PD1-PD8) of the line sensor 26 into digital values, one after another through the A/D converter and then by writing the converted data into the prescribed addresses in the RAM 32.

Upon completion of the above process, the storage time remains constant. The lighting of the IRED 16 occurs only while the clear gate signal ICG is applied to the line sensor 26 at a low level in accordance with a command from the sequence controller 40. In other word, an infrared light reflected by a distance measuring object 20 comes into each of the light sensitive elements PD1-PD8 through the filter 24 and the lens 22. Then, in accordance with the principle of trigonometric measurement, the amount of the incident light becomes the largest at the element that is located in a position corresponding to the distance to the object 20. With the lighting of the IRED 16 during the storage time, the line sensor 26 has the infrared reflection light component applied thereto as superposed upon an external light level. The point at which this superposed component becomes the largest corresponds to the distance to the object.

With the signal of light including the infrared reflection light component stored through the process as described above, the in-take of the scanning signal DV is performed. This in-take process is performed by converting the components of the scanning signal DV corresponding to individual bits, i.e. elements, of the line sensor 26 into digital values one after another and then by writing the data thus obtained into the prescribed addresses at the RAM 32 as applicable.

Figure 5:
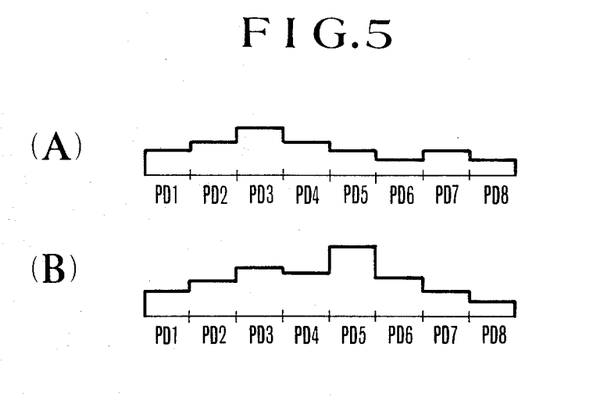
FIG. 5 is a wave form chart showing the operation of the arrangement of FIG. 2.
Figure 6:
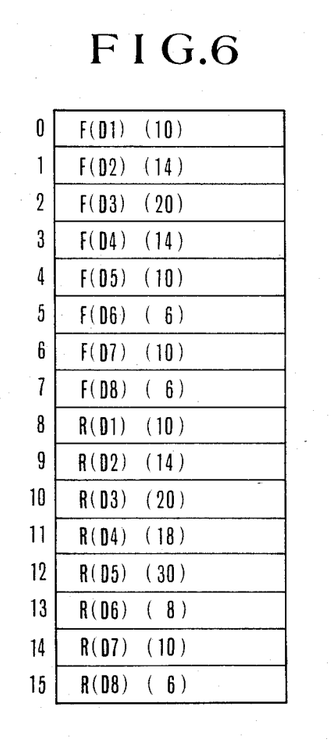
FIGS. 6 and 7 are illustrations of the contents of a RAM shown in FIG. 2 showing data obtained under each of different conditions.

FIG. 5 shows examples of the distribution of the infrared light obtained as the result of the processes described in the foregoing. The distribution of light shown at FIG. 5(A) is obtained with the IRED 16 unlit while the distribution shown at FIG. 5(B) is obtained with the IRED 16 lighted. Let us assume that the A/D converted data of the light sensitive elements PD1-PD8 obtained with the IRED 16 unlit are expressed as F(D1)-F(D8) and the A/D converted data obtained with the IRED 16 lighted are expressed as R(D1)-R(D8). Under the control of the sequence controller 40, these data are stored at applicable addresses "0"-"15" of the RAM 32 as shown in FIG. 6. Referring now to FIG. 6, the parenthesized values shown in the right hand side column of FIG. 6 are given as examples of actual numerical data.

Figure 7:
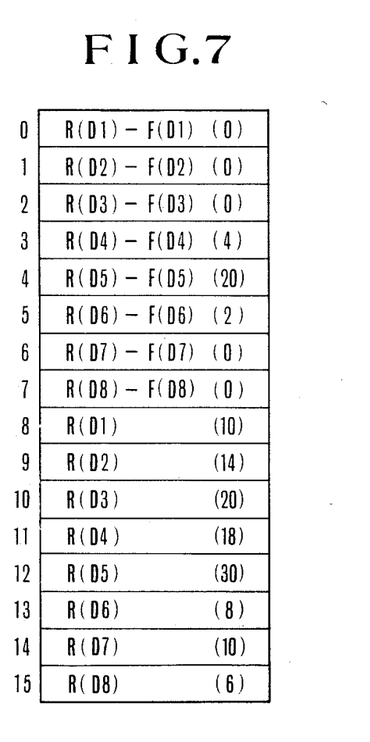

Under such conditions, the distance measuring computation is carried out in the following manner: First, the datum R(D1) at the address "8" of the RAM 32 is stored in the register 34. Second, the datum F(D1) at the address "0" of the RAM 32 is subtracted from the content R(D1) of the register 34 at the operation circuit 36. A resultant datum R(D1)-F(D1) thus obtained is stored in the register 34. After that, the stored datum of the register 34 is again stored at the address "0" of the RAM 32. Then, each of the data R(D(n+8)), at each of the addresses "n+8" (n=1, 2, ---, 7), of the RAM 32 are likewise stored in the register 34. Following that, each of the data F(D(n)) at each of the addresses "n" of the RAM 32 is subtracted from the content of the register 34 by circuit 36 respectively. The resultant data R(D(n+8))-F(D(n)) are stored in the register 34 and then are again stored at the addresses "n" in the RAM 32. After completion of this process, the contents of the RAM 32 becomes as shown in FIG. 7. Further, the above stated computing operations are all performed in accordance with commands from the sequence controller 40. The parenthesized values shown in the right hand side column of FIG. 7 are given as examples of actual numerical data in the same manner as in FIG. 6.

As a result of the operation described above, a datum corresponding to a difference between signals produced for each of the light sensitive elements PD1-PD8 with the IRED 16 lighted up and unlit is stored at each of the corresponding addresses "0" to "7". As mentioned in the foregoing, the position of the light sensitive element which has the largest difference value among the array of the light sensitive elements corresponds to the distance of the measuring object.

Accordingly, of the addresses "0" to "7" of the RAM 32, the address having the largest difference datum value represents the distance to the distance measuring object. The process of finding out the largest value among the addresses "0" to "7" is as described below:

The datum R(D1)-F(D1) of the address "0" is first stored in the register 34. The operation circuit 36 then subtracts the datum R(D2)-F(D2) of the address "1", of the RAM 32, from the datum stored in the register 34. With regard to this subtracting operation, it is not the result of the operation that matters. When the operation circuit produces a carry during the subtracting operation, the sequence controller 40 judges the condition of the carry flip-flop 38 which stores the carry. With a carry produced as a result of the subtraction, the datum of the address "1" is judged to be larger than the datum of the address "0" of the RAM 32. Accordingly, the sequence controller 40 causes a datum representing the address "1" to be written in the address "8" of the RAM 32 and, at the same time, stores the datum of the address "1" in the register 34. Conversely, when no carry is produced as a result of the subtraction, the datum of the address "0" is judged to be larger than the datum of the address "1". In that case, the sequence controller 40 causes a datum representing the address "0" to be written in the address "8" of the RAM 32 and causes the datum of the address "0" to be again stored in the register 34.

Following that, the operation circuit 36 subtracts the datum R(D3)-F(D3) of the address "2" of the RAM 32 from the datum of the register 34. The result of this subtraction is also processed in the same manner as the process mentioned above. A datum representing the address "2" is written in the address "8" only when the datum of the address "2" is larger.

The steps described in the foregoing are repeated until the datum R(D8)-F(D8) of the address "7" of the RAM 32 is stored in the register 34 and is processed by the operation circuit 36 in the same manner. As a final result of this, a datum corresponding to the distance of the distance measuring object 20, i.e. information on one address that has the largest difference signal among the addresses of the RAM 32, is left at the address "8" of the RAM 32.

In cases where the distance to the distant measuring object 20 is extremely long, the infrared light is not sufficiently reflected and returned. In such a case, it suffices to make a judgement that the distance measuring object 20 is located farther away than a prescribed distance. This judgement can be arrived at on the condition that the level of the signal produced from the line sensor 26 remains unchanged both when the IRED 16 is lighted up and when it is not lighted up. In such a case, at the stage of storing data relative to difference signals in the RAM 32, all the data of addresses from "0" to "7" theoretically become "0" and this would facilitates the judgement.

In the practical applications of the present invention, however, it can hardly be expected that noises of the scanning signal obtained from the line sensor 26, an error of the digital conversion through the A/D converter 30, etc. all completely become "0". In this particular embodiment, this problem is solved by judging whether or not all the difference data is below a prescribed value before detection of the maximum value of the difference data. More specifically, the data of addresses "0" to "7" of the RAM 32 are read out one by one in accordance with commands from the sequence controller 40 to compare them at the operation circuit 36 with a predetermined constant datum stored beforehand in the register 34. The condition of the carry flip-flop 38 is judged at every step of the comparison. When the condition of the carry flip-flop 38 remains unchanged at every step of comparison, the distance measuring object 20 is judged to be located at a distance farther than a prescribed distance. With the object thus judged to be located farther than the prescribed distance, the maximum difference datum value judging process is not carried out.

While the number of bits of the line sensor is set at eight in the embodiment described above, the present invention is not limited to that. The number of bits can be altered as desired according to the degree of resolution required for distance measurement. The number of bits of the A/D converter is also not limited to eight and of course can be selected to correspond to the number of bits in the line sensor.

Further, the foregoing description of a specific embodiment shows a combination of an RAM and a digital sequence controller together with a specific signal processing method. However, it is to be understood that this invention is not limited to this and may be practiced in accordance with one of various known different signal processing methods.

In accordance with this invention, the use of a storage type radiant ray sensor for carrying out distance measurement of the radiant ray projecting type dispenses with circuits for modulation and demodulation of radiant rays. The invented device excels in noise-proof capability. The device is capable of carrying out distance measurement without use of moving parts and gives distance information in the form of digital data. The invention thus gives a novel distance measuring device which can be advantageously used for an apparatus such as a camera to facilitate lens control thereof.

What I claim:

1. A device for detecting the range of an object, comprising:
   (a) projecting means for projecting a beam of radiation toward the object,
   (b) an accumulation type linear sensor array having a plurality of sensing elements each of which produces electrical data in response to received radiation;
   (c) a shift register having the same number of registers as that of said sensing elements, said register being connected to said linear array to parallel transfer datum of said sensing elements;
   (d) first memory means for memorizing the datum transferred to said shift register as it is serially read out from said shift register;

(e) second memory means for memorizing the datum transferred to said shift register as it is serially read out from said shift register;

(f) control means for controlling said shift register such that said first memory means is allowed to memorize that datum which occurs when said projecting means is not driven, and said second memory means is allowed to memorize that datum which occurs when said projecting means is driven;

(g) computing means for subtracting the datum memorized in said first memory means from the datum memorized in said second memory means; and (h) means for detecting a maximum value of the computation values of said computing means and using said maximum value as a distance measuring information.

2. A device according to claim 1 wherein said control means comprises means arranged such that when said projecting means is not driven, the data accumulated on said linear array sensor is parallel transferred to said shift register, and the data stored on said shift register is then serially transferred to be memorized by said first memory means, then after the data has been memorized in said first memory means, when said projecting means is driven, other data accumulated on said linear array sensor is parallel transferred to said shift register and the data stored on said shift register is then serially transferred to be memorized by said second memory means.

3. A device for detecting the range of an object, comprising:

(a) means for projecting a beam of radiation toward the object;

(b) means for sensing radiation and having an accumulation type linear array of a plurality of sensing elements each of which produces electrical datum in response to received radiation;

(c) a circuit for controlling the integration period of said sensing means, said circuit being arranged to adjust the integration period to a value such that the output of said sensing means becomes lower than a prescribed level when said projecting means is not driven, to memorize this value, and to control the integration period in accordance with the memorized value when said projecting means is driven; and (d) means for producing measured distance information depending on the difference between the output of said sensing means which is produced when said projecting means is driven and the output of said sensing means which is produced when said projecting means is not driven.

4. A method for detecting range of an object, comprising the steps of:

(A) sensing radiation with a linear array of a plurality of sensing elements each producing electrical data corresponding to received radiation at a first state where a beam of radiation is not projected toward said object and a second state when a beam of radiation is projected toward the object;

(B) memorizing, by a memory means having a number of memories corresponding to said sensing elements, the differential electrical data between the electrical data at the first state and the electrical data at the second state; and (C) detecting the object range on the basis of the electrical data memorized in said memory means, said range determination step including:

(1) the first step of comparing the contents of two memories selected from the memories of said memory means and transferring the content of one memory which is larger than the other to another memory;

(2) second step of comparing the content of said other memory with that of one of unselected memories and transferring the content which is larger than the other to still another memory; and (3) repeating the second step of comparing until all of the memories that said memory means has are selected.

5. A device detecting the range of an object, comprising:

(a) means for projecting a beam of radiation toward said object;

(b) an accumulation type linear sensor array having a plurality of sensing elements each of which produces electrical data in response to received radiation;

(c) a shift register having a number of registers equal to the number of said sensing elements, said registers being connected to said linear array so as to transfer a datum of said sensing elements;

(d) first memory means for memorizing the datum that was transfered to said shift register as it is read out from said shift register;

(e) second memory means for memorizing the datum that was transformed to said shift register as it is read out from said shift register;

(f) a sequence control circuit operating such that as said projecting means is rendered inoperative, that data which is accumulated on said linear array sensor when no radiation is projected after having been stored on said shift register is transferred to and memorized in said first memory means, and as said projection means is rendered operative, the data which is accumulated on said linear array sensor when radiation is projected after having been stored on said shift register is transferred to and memorized in said second memory means;

(g) computing means for subtracting the datum memorized in said first memory means from the datum memorized in said second memory means; and (h) means for detecting a peak value of the computed values by said computing means and taking it as the measured distance information.

* * * * *